(12) United States Patent
Muramatsu et al.

(10) Patent No.: US 7,997,776 B2
(45) Date of Patent: Aug. 16, 2011

(54) INDICATING INSTRUMENT FOR VEHICLE

(75) Inventors: Takaaki Muramatsu, Obu (JP); Toshiki Wada, Kariya (JP)

(73) Assignee: Denso Corporation, Kariya (JP)

( * ) Notice: Subject to any disclaimer, the term of this patent is extended or adjusted under 35 U.S.C. 154(b) by 1560 days.

(21) Appl. No.: 11/371,027

(22) Filed: Mar. 9, 2006

(65) Prior Publication Data

US 2006/0215412 A1 Sep. 28, 2006

(30) Foreign Application Priority Data

Mar. 10, 2005 (JP) ................................ 2005-067821

(51) Int. Cl.
*B60Q 3/00* (2006.01)
(52) U.S. Cl. ........................................ 362/489; 362/276
(58) Field of Classification Search ............... 362/26, 362/27, 30, 276, 91, 551, 561, 489; 385/146, 385/43, 129, 131; 131/345, 350; 359/49
See application file for complete search history.

(56) References Cited

U.S. PATENT DOCUMENTS

| | | | |
|---|---|---|---|
| 6,302,551 B1 * | 10/2001 | Matumoto | 362/27 |
| 6,595,667 B1 * | 7/2003 | Obata | 362/489 |
| 6,729,738 B2 * | 5/2004 | Fuwausa et al. | 362/84 |
| 6,750,779 B2 | 6/2004 | Wada et al. | |
| 6,886,970 B2 | 5/2005 | Wada et al. | |
| 2001/0024361 A1 * | 9/2001 | Suzuki et al. | 362/23 |
| 2003/0043049 A1 * | 3/2003 | Wada et al. | 340/815.4 |
| 2003/0095397 A1 * | 5/2003 | McGowan | 362/27 |
| 2005/0117367 A1 * | 6/2005 | Chikugawa | 362/561 |
| 2005/0201095 A1 * | 9/2005 | Brase et al. | 362/276 |

FOREIGN PATENT DOCUMENTS

| | | |
|---|---|---|
| JP | 2-234857 | 9/1990 |
| JP | 6-17159 | 5/1994 |
| JP | 2848512 | 11/1998 |

OTHER PUBLICATIONS

Office Action dated Oct. 28, 2009 issued in corresponding Japanese Application No. 2005-067821 with an at least partial English-language translation thereof.

* cited by examiner

*Primary Examiner* — Jong-Suk (James) Lee
*Assistant Examiner* — Peggy A. Neils
(74) *Attorney, Agent, or Firm* — Nixon & Vanderhye P.C.

(57) ABSTRACT

An indicating instrument for a vehicle has a display board and a light modulation member disposed to cover a surface of the display board. When a condition that an illumination intensity of the display board is lower than a threshold value has continued for a first time period, a light transmissivity of the light modulation member is controlled to a first level so that a driver can easily see the display board. When a condition that the illumination intensity of the display board is equal to or higher than the threshold value has continued for a second time period, the light transmissivity of the light modulation member is controlled to a second level that is lower than the first level to restrict entry of external light to the display board.

22 Claims, 4 Drawing Sheets

INDICATING INSTRUMENT FOR VEHICLE

CROSS REFERENCE TO RELATED APPLICATION

This application is based on Japanese Patent Application No. 2005-67821 filed on Mar. 10, 2005, the disclosure of which is incorporated herein by reference.

FIELD OF THE INVENTION

The present invention relates to an indicating instrument for a vehicle, having a light modulation member in front of a display board, particularly, relates to a control operation of a light transmissivity of the light modulation member according to illumination conditions of the display board.

BACKGROUND OF THE INVENTION

In an indicating instrument for a vehicle, various methods has been proposed to provide an enhanced appearance. For example, it is proposed to provide a display board with a metallic, lustrous surface, thereby to improve a quality appearance. In this case, however, if an external light, such as, a sunlight, is reflected on the display board while the vehicle is running, it is likely to blind a driver and reduce visibility.

In an indicating instrument disclosed in JP-A-2003-156369 (U.S. Pat. No. 6,886,970 B2), a light transmissivity of a light modulation film is controlled based on illumination conditions of a display board so as to maintain the visibility. Namely, when the display board is relatively bright, the light transmissivity of the light modulation film is controlled to a relatively low level. On the other hand, when the display board is relatively dark, the light transmissivity of the light modulation film is controlled to a relatively high level.

Incidentally, while the vehicle is running, the quantity of external light incident on the display board occasionally momentarily changes depending on driving circumstances. The driver is unlikely to sense such an instant change of the incident light because of visual characteristic. In this case, if the light transmissivity of the light modulation film is linearly changed with the instant change of the incident light, it is likely to cause flicker and deteriorate visibility of the display board.

SUMMARY OF THE INVENTION

The present invention is made in view of the foregoing matter, and it is an object of the present invention to provide an indicating instrument for a vehicle, having a light modulation film in front of a display board and a method of controlling a light transmissivity of the light modulation film, for restricting a driver from being blind with a light reflected on the display board and sufficiently maintaining a visibility of the display board.

According to an aspect of the present invention, an indicating instrument for a vehicle, has a display board, a light modulation member, a light detecting member and a control unit. The light modulation member is disposed in front of the display board to cover a display surface of the display board. The light detecting member is disposed to detect an illumination condition of the display board, e.g., the quantity of external light incident on the display board and an illumination intensity of the display surface. The control unit controls light transmissivity of the light modulation member according to the illumination condition of the display board. When a condition that the quantity of external light is lower than a threshold value has continued for a first time period, the light transmissivity of the light modulation member is controlled to a first level. When a condition that the quantity of external light is equal to or higher than the threshold value has continued for a second time period, the light transmissivity of the light modulation member is controlled to a second level that is lower than the first level.

Accordingly, the light transmissivity of the light modulation member is changed when the first time period or second time period has elapsed since the quantity of incident light decreased below or exceeded above the threshold value. Namely, a timing of changing the light transmissivity is delayed for the first time period or the second time period. It is less likely that the light transmissivity will be changed with an instant change of the external light. Therefore, the driver feels normal appearance and visibility of the display board is sufficiently maintained.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

Figure 1:
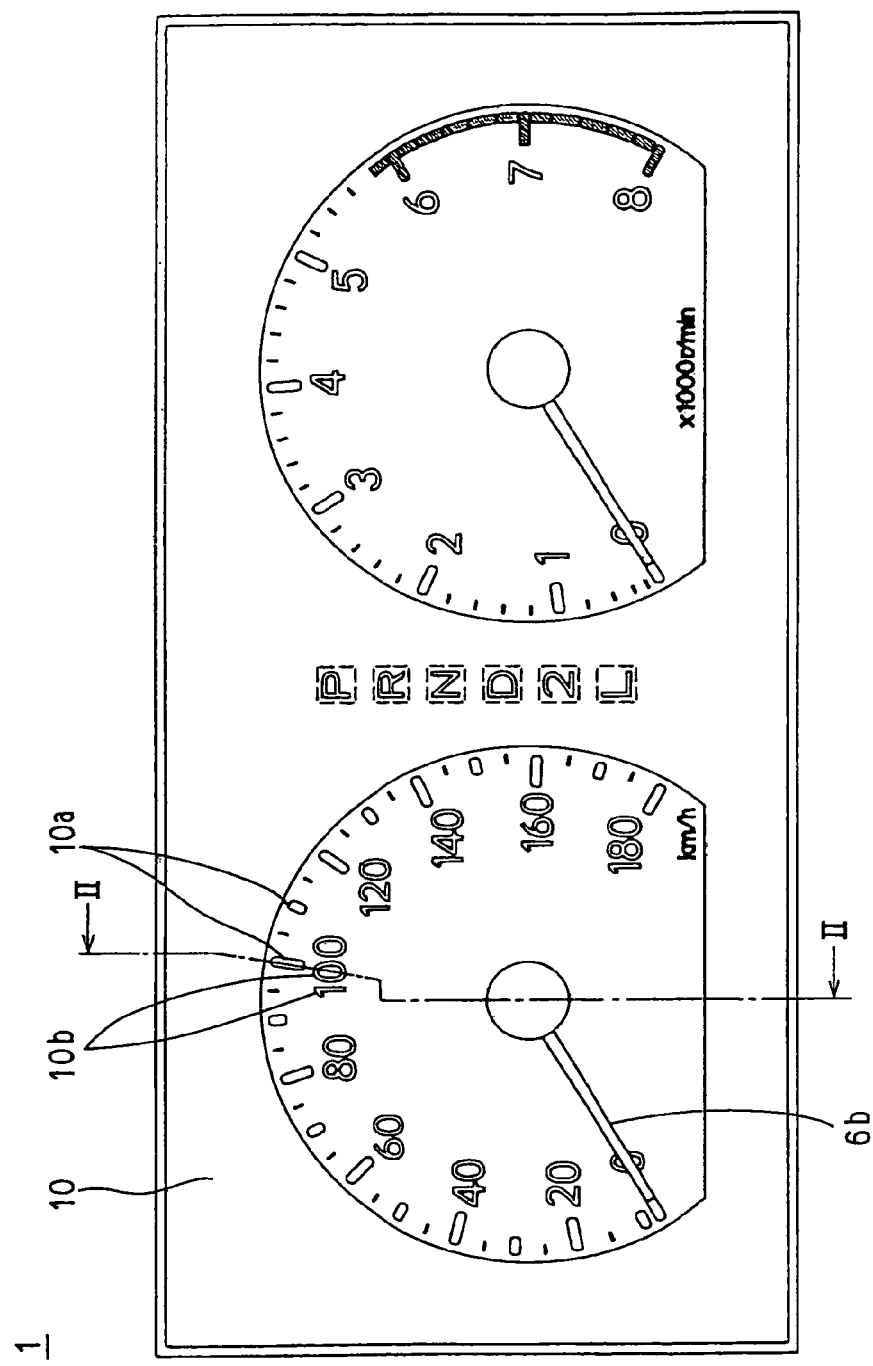
FIG. 1 is a front view of a combination meter according to an embodiment of the present invention.

An example embodiment of the present invention will now be described with reference to FIGS. 1 to 6C. As shown in FIG. 1, an indicating instrument of the present invention is exemplary employed to a combination meter 1 for the vehicle. The combination meter 1 is located at a front position of a passenger compartment where a driver can easily see it. The combination meter 1 has a display board 10 on which various information is displayed.

Figure 2:
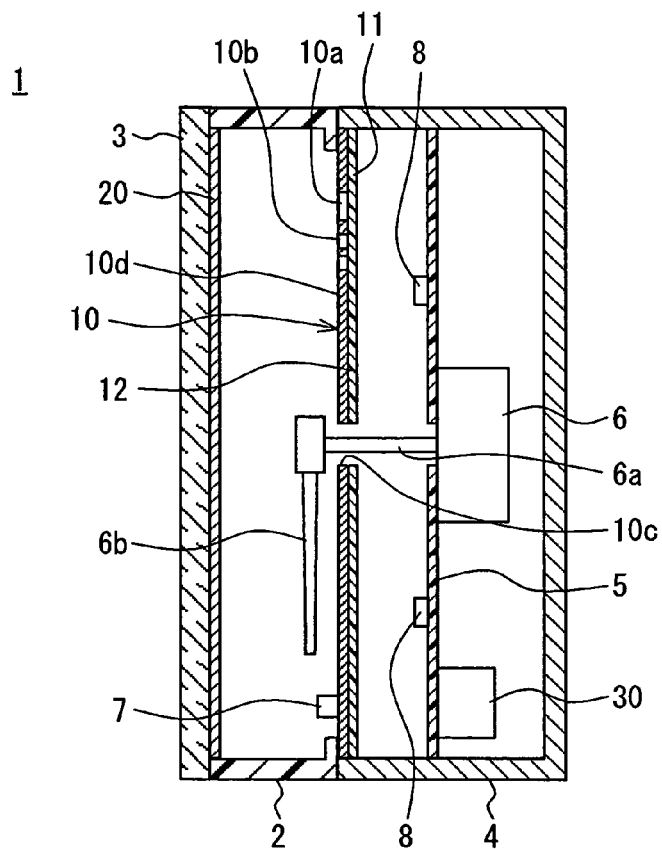
FIG. 2 is a cross-sectional view of the combination meter, taken along line II-II in FIG. 1.

The display board 10 is made of a thin metallic plate, such as an aluminum sheet. The display board 10 has a plurality of scales 10a and characters 10b. As shown in FIG. 2, the scales 10a and the characters 10b are formed of predetermined shaped holes that are made by pressing or etching. A display surface 10d of the display board 10 is gloss finished or mirror finished to have lustrous for providing an enhance appearance. Further, the display surface 10d is ornamented with a pattern such as hairlines or fish scales. On the display surface 10d, a display surface illumination sensor 7 is fixed to detect an illumination condition, e.g., the quantity or intensity of incident light per unit area on the display surface 10d.

A light conducting plate 11 is fixed to a rear surface of the display board 10. The light conducting plate 11 conducts light emitted from a pair of light emitting diodes (LED) 8 to the scales 10a and the characters 10b for illuminating the scales 10a and the characters 10b. The light conducting plate 11 is made of a transparent or translucent resin, such as an acrylic resin.

The display board 10 and the light conducting plate 11 are covered by a casing 4 from the rear side. A printed circuit board 5 having an electric circuit of the combination meter 1 is accommodated in the casing 4, on the rear side of the display board 10. A movement 6 is fixed on the printed circuit board 5. The movement 6 rotates a pointer shaft 6a according to an outer signal. The shaft 6a extends through a through hole 10c formed on the display plate 10 and carries a pointer 6b at its end.

The pointer 6b is a self-illuminating pointer and is for example made of an electric discharge tube or a light-conducting member that introduces light from outside. The pair of light emitting diodes 8 is fixed to the front surface of the printed circuit board 5, which is opposed to the display board 10 and the light conducting plate 11, as a light source for illuminating the display board 10.

Further, a controller 30 is fixed on the printed circuit board 5 for controlling a voltage applied to a light modulation film 20. The controller 30 is for example made of a hybrid IC.

A front surface of the display board 10 is covered with a transparent cover 3 through a ring-shaped hood 2. The cover 3 has a plate shape and is made of a transparent material such as a polycarbonate. The light modulation film 20 is attached to a whole surface of the cover 3, which is opposed to the front surface of the display board 10, as a light modulation member.

Figure 3:
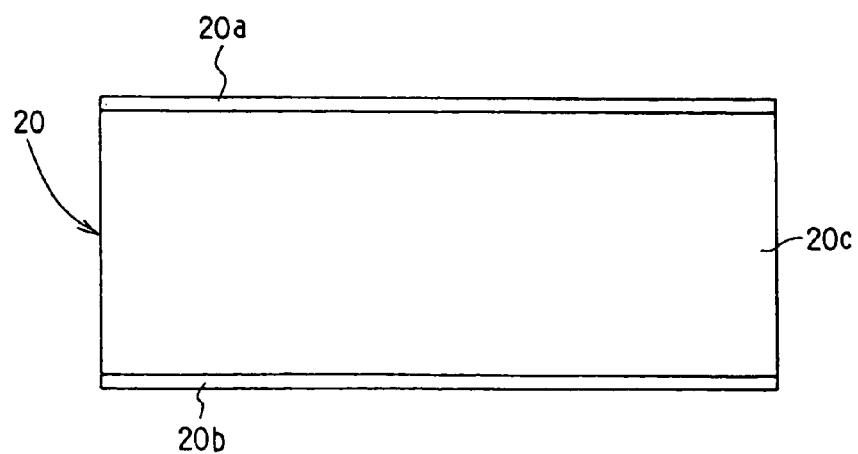
FIG. 3 is a front view of a light modulation film of the combination meter according to the embodiment of the present invention.

The light modulation film 20 is constructed of an electrochromic display device (ECD) that is disposed between and protected by a pair of glass panels. As shown in FIG. 3, the light modulation film 20 has a pair of transparent electrodes 20a, 20b made of such as ITO and an intermediate member 20c disposed between the electrodes 20a, 20b. The intermediate member 20c is made of a mixed material of an electrolyte and an electrochromic material (EC). A condition of the electrochromic material changes with the voltage applied across the electrodes 20a, 20b. Thus, the light transmissivity of the light modulation film 20 is changed with the condition of the electrochromic material.

When the voltage applied across the electrodes 20a, 20b is zero, the light transmissivity of the light modulation film 20 is approximately 70%, which is the highest level. The light transmissivity reduces with an increase of the applied voltage. When a predetermined voltage Ec is applied, the light transmissivity is approximately 30%.

In FIG. 2, the illumination sensor 7 is fixed to the display board 10. Instead, the illumination sensor 7 can be fixed to the printed circuit board 5, under a light transmitting part of the display board 10.

Figure 4:
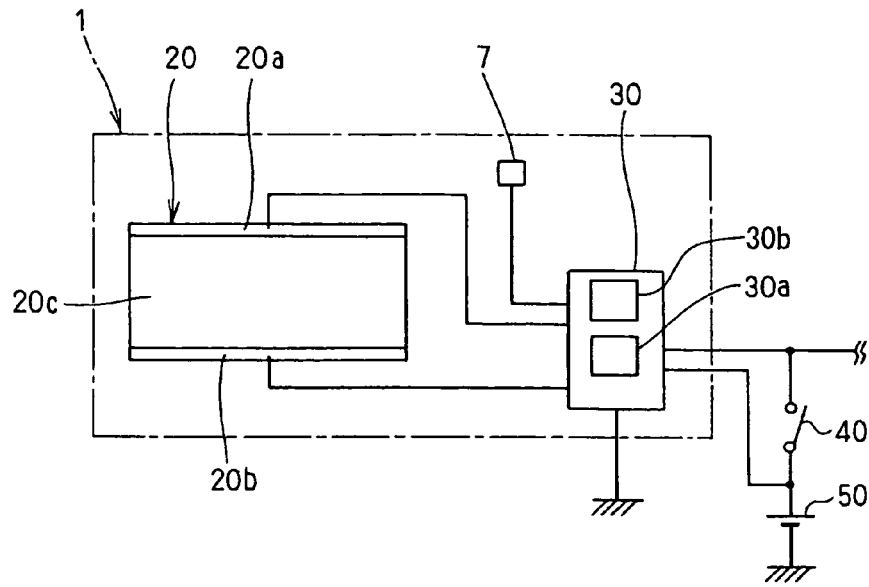
FIG. 4 is a circuit diagram of a controller of the combination meter for controlling light transmissivity of the light modulation film according to the embodiment of the present invention.

As shown in FIG. 4, the controller 30 includes a ROM 30a and a RAM 30b. The controller 30 is normally supplied with electric power from a battery 50. The controller 30 is electrically connected to the illumination sensor 7, an ignition switch 40, and the electrodes 20a, 20b of the light modulation film 20.

The controller 30 obtains a detection signal (hereafter, an illumination signal) from the illumination sensor 7 every 0.1 second, and successively stores values X1 of the illumination signals in the RAM 30b. The controller 30 controls the voltage applied to the electrodes 20a, 20b in accordance with a program shown in FIG. 5, based on the value X1 of the illumination signal and a detection signal of the ignition switch 40.

The program and a threshold value SH are stored in the ROM 30a. The threshold value SH is an illumination level at which the driver is likely to be blind, particularly, with the external light reflected on the display surface 10d. The RAM 30b reserves an area for storing the values X1 of the illumination signal therein.

Figure 5:
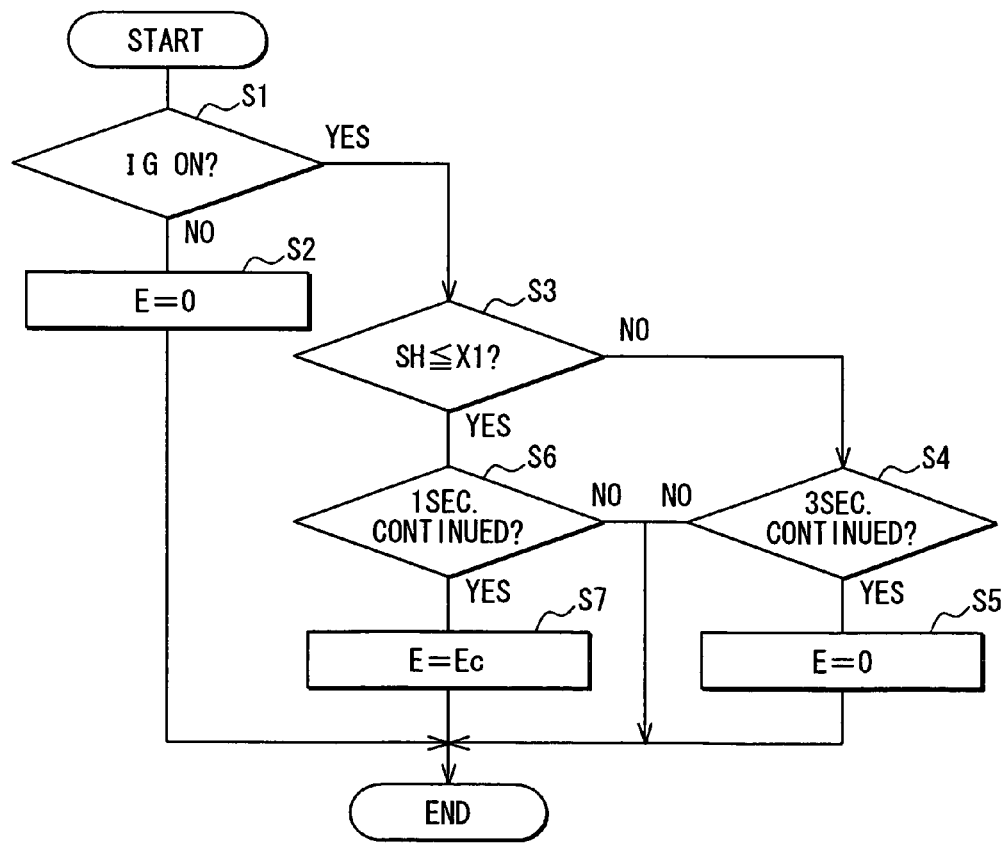
FIG. 5 is a flow diagram of a voltage control operation of the controller according to the embodiment of the present invention.

Hereafter, a voltage control operation of the controller 30 will be described with reference to the flow diagram shown in FIG. 5. First, at a step S1, it is determined whether the ignition switch 40 is at ON. When it is determined that the ignition switch 40 is not at ON, that is, the ignition switch 40 is at OFF, ACC, or STAT, the voltage E to be applied to the light modulation film 20 is set to 0, at a step S2 because the vehicle is not operated. Thus, the light transmissivity of the light modulation film 20 is 70%, and the light modulation film 20 is almost transparent. Accordingly, the driver can clearly see the display board 10. The lustrous display board 10 provides an enhanced appearance to the driver.

When it is determined that the ignition switch 40 is at ON at the step S1, the vehicle is in an operative condition. It is determined whether the value X1 of the illumination signal is equal to or higher than the threshold value SH, at a step S3. When it is determined that the value X1 is lower than the threshold value SH at the step S3, it is determined whether a condition that the illumination intensity is lower than the threshold value SH has continued for a first time period (e.g., three seconds) at a step S4.

When it is determined that the condition that the illumination intensity is lower than the threshold value SH has continued for the first time period P1 at the step S4, the voltage E is set to 0 at a step S5. The value X1 of the illumination signal is sampled every 0.1 second and stored in the RAM 30b. Therefore, the voltage can be set to 0 when the values lower than the threshold value SH are continuously stored thirty times at the step S5. Further, when it is determined that the condition that the illumination intensity is lower than the threshold value SH has continued for the first time period P1 at the step S4, the voltage is not changed.

On the other hand, when it is determined that the value X1 is equal to or higher than the threshold value SH at the step S3, it is determined whether a condition that the illumination intensity X1 is equal to or higher than the threshold value SH has continued for a second time period (e.g., one second) at a step S6. When it is determined that the condition has continued for the second time period P2 at the step S6, the voltage E is set to Ec at a step S7. Since the illumination signal X1 is sampled for every 0.1 seconds in the RAM 30b, the voltage can be set to the level Ec when the values equal to or higher than the threshold value SH are continuously stored ten times at the step S7. When it is determined that the condition has not continued for the second time period P2 at the step S6, the voltage is not changed.

Figure 6A:
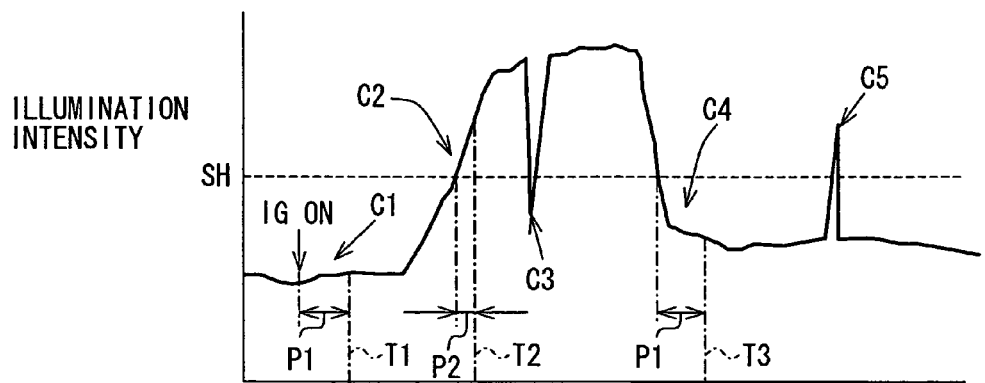
FIG. 6A is a graph showing an illumination intensity of a display surface of the combination meter according to the embodiment of the present invention.
Figure 6B:
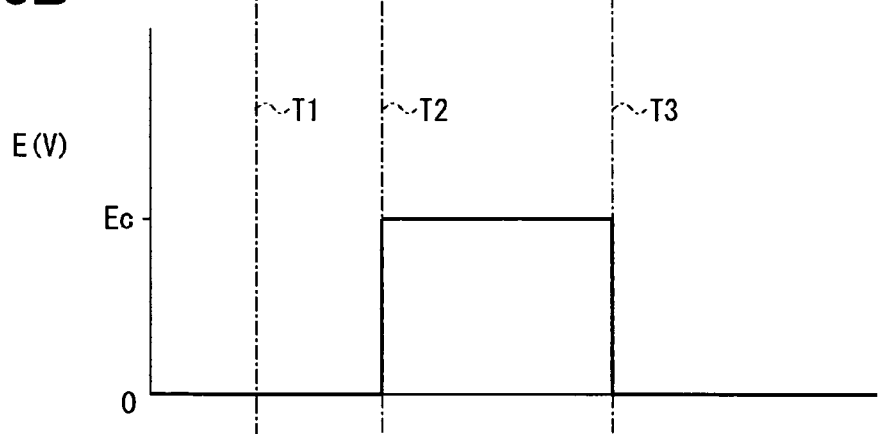
FIG. 6B is a graph showing a voltage applied to the light modulation film according to the embodiment of the present invention.
Figure 6C:
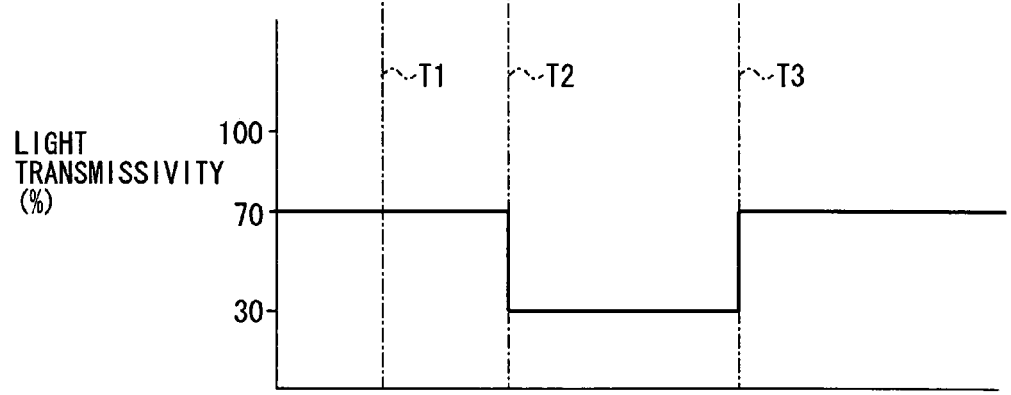
FIG. 6C is a graph showing the light transmissivity of the light modulation film relative to the voltage according to the embodiment of the present invention.

Hereafter, example cases in which the above control operation is performed will be described with reference to FIG. 6A. FIG. 6A is a graph showing the illumination intensity X1 of the display surface 10d detected by the illumination sensor 7. In FIG. 6A, arrows C1 to C5 correspond to the following example cases. Also, FIG. 6B is a graph of the voltage applied to the light modulation film 20 relative to the illumination intensity X1 of the display surface 10d. FIG. 6C is a graph showing the light transmissivity of the light modulation film 20 relative to the applied voltage.

First, in the case C1, the illumination intensity X1 of the display surface 10d is lower than the threshold value SH (No, at the step S3) after the ignition switch 40 is turned on. Because the condition that the illumination intensity X1 is lower than the threshold value SH has continued for the first time period P1 (YES, at the step S4), the voltage E to be applied to the light modulation film 20 is set to 0 at a timing T1 (step S5). Accordingly, the light transmissivity of the light modulation film 20 is approximately 70%, and a predetermined visibility is maintained.

In the case C2, the quantity of external light incident on the display surface 10d increases and the illumination intensity X1 exceeds the threshold value SH (YES, at the step S3). In this case, because the condition that the illumination intensity X1 is equal to or higher than the threshold value SH has continued for the second time period P2 (YES, at the step S6), the voltage E is set to Ec at a timing T2 (step S7). Thus, the light transmissivity of the light modulation film 20 becomes approximately 30%. Since the light modulation film 20 limits entry of the external light to the display surface 10d, it is less likely that the driver will be blind with the light reflected on the display board 10.

In the case C3, the quantity of external light incident on the display surface 10d is momentarily changed due to a driving circumstance. At this time, the illumination intensity X1 momentarily decreases below the threshold value SH and returns to the value higher than the threshold value SH. Since the condition that the illumination intensity X1 is equal to or higher than the threshold value SH has not continued for the second time period P2 (NO, at the step S6), the voltage to the light modulation film 20 is not changed.

In the case C4, the quantity of light incident on the display surface 10d decreases and the illumination intensity X1 becomes lower than the threshold value SH (NO, at the step S3). Because the condition that the value X1 is lower than the threshold value SH has continued for the first time period P1, the voltage to the light modulation film 20 is set to 0 at a timing T3 (step S5). Thus, the light transmissivity of the light modulation film 20 becomes approximately 70%. Accordingly, the predetermined visibility is maintained.

The case C4 for example corresponds to a situation that the vehicle enters a tunnel. It is assumed that the vehicle enters the tunnel in a condition that the illumination intensity X1 is higher than the threshold value SH. While the vehicle is still near an entrance of the tunnel, and it has not elapsed for three seconds since the vehicle entered the tunnel, the light transmissivity of the light modulation film 20 is approximately 30%. Thereafter, when the vehicle separates from the entrance and reaches a position where the external light is blocked, i.e., when three seconds has elapsed since the illumination intensity X1 decreases under the threshold value SH, the voltage is set to 0. Thus, the light transmissivity of the light modulation film 20 becomes approximately 70%. Accordingly, the driver can easily see the display board 10.

Further, in the case C5, the illumination intensity X1 of the display surface 10d momentarily exceeds the threshold value SH. In this case, the voltage to the light modulation film 20 is not changed (NO, at the step S4). This is likely to occur when the vehicle passes through shadows of high buildings or trees.

In the above example embodiment, when the illumination intensity X1 of the display surface 10d is equal to or higher than the threshold value SH, the light transmissivity of the light modulation film 20 is set to a low level. Since the light modulation film 20 limits the entry of the external light to the display surface 10d, it is less likely that the driver will be blind with the reflected light. On the other hand, when the illumination intensity X1 of the display surface 10d is lower than the threshold value SH, the light transmissivity of the light modulation film 20 is set to a high level, to provide the predetermined visibility.

Furthermore, the timing of changing the light transmissivity of the light modulation film 20 is delayed for the first time period P1 or the second time period P2 in the above-described manner. Therefore, it is less likely that the voltage to the light modulation film 20 will be changed with the instant change of the illumination intensity X1 of the display surface 10d as the cases C3 and C5. Accordingly, the change of the light transmissivity feels normal and the display board 10 maintains sufficient visibility.

As described in the above, the light transmissivity of the light modulation film 20 is changed from 70% to 30% when the illumination intensity X1 of the display surface 10d exceeds the threshold value SH. In this case, it is necessary to instantly reduce the light transmissivity so as to restrict the driver from being blind with the reflected external light on the display surface 10d.

On the other hand, the light transmissivity is changed from 30% to 70% when the illumination intensity X1 of the display surface 10d decreases below the threshold value SH, such as when the vehicle entered the tunnel. For example, near the entrance of the tunnel, the display surface 10d is likely to receive the external light. Therefore, it is preferable to increase the light transmissivity when the illumination intensity X1 of the display surface 10d becomes stable below the threshold value SH, such as when the vehicle completely entered the tunnel.

When the quantity of the incident light momentarily reduces to the value lower than the threshold value SH and returns to the value higher than the threshold value SH as the case C3, it is preferable to increase the light transmissivity when the quantity of incident light becomes stable above the threshold value SH so that the driver will not be blinded.

In the above example embodiment, the first time period P1 for determining the timing to increase the light transmissivity is longer than the second time period P2 for determining the timing to decrease the light transmissivity. Accordingly, since the reflection of the external light on the display board 10 is restricted, it is less likely that the driver will be blind.

The example embodiment of the present invention is described above. However, the present invention is not limited to the above embodiment, but may be implemented in other ways without departing from the spirit of the invention.

In the above example embodiment, the ECD is used as a light modulation member 20, and the light transmissivity of the ECD is easily controlled in the above manner. Instead, a transmissive liquid crystal display (LCD) can be used. The light transmissivity of the LCD can be controlled in the similar manner.

The first time period P1 and the second time period P2 are not limited to three seconds and one second, respectively. The first time period P1 and the second time period P2 may be set to different time periods as long as the first time period P1 is longer than the second time period P2.

The light transmissivity of the light modulation film 20, which is controlled based on the illumination intensity of the display surface 10d with respect to the threshold value SH, is not limited to 30% and 70%. The voltage to be applied to the light modulation film 20 can be set to other values so that the light modulation film 20 has transmissivity other than 30% and 70%, as long as the light modulation film 20 restricts the driver from being blind and maintains a sufficient visibility.

Information displayed on the display board 10 is not limited to the examples shown in FIG. 1. Other information can be displayed on the display board 10 with different arrangement.

What is claimed is:

1. An indicating instrument for a vehicle, comprising:
a display board having a display surface configured to reflect an external light incident on the display surface;
a light modulation member located in front of the display board, the light modulation member having variable light transmissivity;
a light detecting member disposed to detect a quantity of external light incident on the display board; and
a control unit for controlling the light transmissivity of the light modulation member, wherein
the control unit controls the light transmissivity of the light modulation member to a first level when a condition that the quantity of external light is lower than a threshold value has continued for a first time period, and to a second level that is lower than the first level when a condition that the quantity of external light is equal to or higher than the threshold value has continued for a second time period.

2. The indicating instrument according to claim 1, wherein the first time period is longer than the second time period.

3. The indicating instrument according to claim 1, wherein the display board comprises a metal plate having a lustrous surface.

4. The indicating instrument according to claim 1, wherein the display board has one of a gloss finished surface and a mirror finished surface.

5. The indicating instrument according to claim 1, wherein the light modulation member comprises one of an electrochromic display device and a transmissive liquid crystal display device.

6. The indicating instrument according to claim 1, wherein the control unit delays a timing of changing the light transmissivity for the first time period when the quantity of incident light decreases below the threshold value and for the second time period when the quantity of incident light exceeds the threshold value.

7. An indicating instrument for a vehicle, comprising:
a display board having a display surface configured to reflect an external light incident on the display surface;
a light modulation member located in front of the display board, the light modulation member having variable light transmissivity;
a light detecting member disposed to detect an illumination intensity of the display surface; and
a control unit for controlling a light transmissivity of the light modulation member, wherein
the control unit controls the light transmissivity of the light modulation member to a first level when a condition that the illumination intensity is lower than a threshold value has continued for a first time period and to a second level that is lower than the first level when a condition that the illumination intensity is equal to or higher than the threshold value has continued for a second time period.

8. The indicating instrument according to claim 7, wherein the first time period is longer than the second time period.

9. The indicating instrument according to claim 7, wherein the display board comprises a metal plate, and the display surface has lustrous.

10. The indicating instrument according to claim 7, wherein the light modulation member comprises one of an electrochromic display device and a transmissive liquid crystal display device.

11. The indicating instrument according to claim 7, wherein the control unit delays a timing of changing the light transmissivity for the first time period when the illumination intensity decreases below the threshold value and for the second time period when the illumination intensity exceeds the threshold value.

12. A method of controlling a light transmissivity of a light modulation member of an indicating instrument, comprising:
detecting an illumination intensity of a display board having a display surface configured to reflect an external light incident on the display surface;
determining a change of the illumination intensity; and
controlling the transmissivity of a light transmissive member located in front of the display board, wherein the transmissivity is controlled to a first level when a condition that the illumination intensity is lower than a threshold value has continued for a first time period and to a second level that is lower than the first level when a condition that the illumination intensity is equal to or higher than the threshold value has continued for a second time period.

13. The method according to claim 12, wherein the first time period is longer than the second time period.

14. The indicating instrument according to claim 1, wherein the first time period is a fixed value and the second time period is a fixed value.

15. The indicating instrument according to claim 7, wherein the first time period is a fixed value and the second time period is a fixed value.

16. The method according to claim 12, wherein the first time period is a fixed value and the second time period is a fixed value.

17. The indicating instrument according to claim 14, wherein the fixed value of the first time period is larger than the fixed value of the second time period.

18. The indicating instrument according to claim 15, wherein the fixed value of the first time period is larger than the fixed value of the second time period.

19. The method according to claim 16, wherein the fixed value of the first time period is larger than the fixed value of the second time period.

20. The indicating instrument according to claim 1, wherein
the light detecting member detects an illumination intensity as the quantity of external light per unit area incident on the display board, and the threshold value is an illumination threshold value,
the control unit determines whether the detected illumination intensity is lower than the illumination intensity threshold value or the detected illumination intensity is higher than the illumination intensity threshold value, and
the control unit controls the light transmissivity of the light modulation member to the first level when a condition that the detected illumination intensity is determined to be lower than the illumination intensity threshold value has continued for the first time period, and to the second level that is lower than the first level when a condition that the detected illumination intensity is determined to be equal to or higher than the illumination intensity threshold value has continued for the second time period.

21. The indicating instrument according to claim 7, wherein the control unit determines whether the detected illumination intensity is lower than the threshold value or the detected illumination intensity is higher than the threshold value, and the control unit controls the light transmissivity of the light modulation member to the first level when the condition that the detected illumination intensity is determined to be lower than the threshold value has continued for the first time period and to the second level that is lower than the first level when the condition that the detected illumination intensity is determined to be equal to or higher than the threshold value has continued for the second time period.

22. The method according to claim 12, further comprising:

determining whether the detected illumination intensity is lower than the threshold value or the detected illumination intensity is higher than the threshold value, wherein the controlling further includes:

controlling the transmissivity of a light transmissive member located in front of the display board, wherein the transmissivity is controlled to the first level when the condition that the detected illumination intensity is determined to be lower than the threshold value has continued for the first time period and to the second level that is lower than the first level when a condition that the detected illumination intensity is determined to be equal to or higher than the threshold value has continued for the second time period.

* * * * *